United States Patent
Nagahashi et al.

(10) Patent No.: US 7,735,616 B2
(45) Date of Patent: Jun. 15, 2010

(54) DOG CLUTCH

(75) Inventors: Yoshiki Nagahashi, Saitama (JP); Isamu Takahashi, Saitama (JP); Kazumitsu Yamamoto, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 674 days.

(21) Appl. No.: 11/598,013

(22) Filed: Nov. 13, 2006

(65) Prior Publication Data

US 2007/0114107 A1 May 24, 2007

(30) Foreign Application Priority Data

Nov. 22, 2005 (JP) .............................. 2005-337693

(51) Int. Cl.
*F16D 11/10* (2006.01)
*F16D 11/14* (2006.01)
(52) U.S. Cl. ................... 192/69.8; 192/108; 192/114 T
(58) Field of Classification Search ................. 192/69.8, 192/69.82, 69.83, 108, 114 T, 69.81; 74/457
See application file for complete search history.

(56) References Cited

U.S. PATENT DOCUMENTS

| | | | | |
|---|---|---|---|---|
| 2,049,127 A | * | 7/1936 | Maybach | 192/69.8 |
| 2,499,954 A | * | 3/1950 | Hook | 192/15 |
| 2,654,456 A | | 10/1953 | Wildhaber | |
| 2,733,795 A | | 2/1956 | Christie | |
| 2,950,797 A | * | 8/1960 | Zieher | 192/108 |
| 3,545,585 A | * | 12/1970 | Eaton, Jr. | 192/108 |
| 3,550,738 A | * | 12/1970 | Halibrand | 192/108 |
| 3,780,840 A | * | 12/1973 | Thomas | 192/108 |
| 5,524,738 A | * | 6/1996 | Erlebach et al. | 192/69.83 |
| 5,870,923 A | * | 2/1999 | Eisen et al. | 72/377 |

FOREIGN PATENT DOCUMENTS

| | | |
|---|---|---|
| FR | 2 558 281 A2 | 7/1985 |
| GB | 318074 A | 8/1929 |
| JP | 2004-074061 A | 3/2001 |

* cited by examiner

*Primary Examiner*—Rodney H Bonck
(74) *Attorney, Agent, or Firm*—Birch, Stewart, Kolasch & Birch, LLP

(57) ABSTRACT

A dog clutch includes a first engagement face and a second engagement face provided on a surface of a driving rotor and a driven rotor with the two surfaces being opposite each other. The first engagement face engaging with its counterpart when a driving force of the driving members is generated. The second engagement face engaging with its counterpart when the driving member receives the driving force from the driven member. The strength of the engagement portion is balanced reflecting the operational torque changing as a power transmission direction changes. A projection drawing to a plane perpendicular to a rotational axis of a driving rotor and of a driven rotor, the inward extension line of the first engagement face passes through a position offset from the position representing the rotational axis, and the inward extension line of the second engagement face passes through the position representing the rotational axis.

16 Claims, 5 Drawing Sheets

DOG CLUTCH

BACKGROUND OF THE INVENTION

CROSS-REFERENCE TO RELATED APPLICATIONS

The present application claims priority under 35 USC 119 to Japanese Patent Application No. 2005-337693 filed on Nov. 22, 2005 the entire contents of which are hereby incorporated by reference.

1. Field of the Invention

The present invention relates to a dog clutch wherein a driving rotor is connected to a driving member and a driven rotor is connected to a driven member that are coaxially arranged as being opposite each other and capable of approaching to be in contact with and moving away from each other. An engagement portion having a first engagement face and a second engagement face is provided on each of a surface of the driving rotor and a surface of the driven rotor with the two surfaces being opposite each other. The first engagement face of the engagement portion on the surface of the driving rotor engages with its counterpart of the driven rotor as the driving rotor and the driven rotor approach to be in contact with each other when driving force of the driving member is generated. The second engagement face of the engagement portion on the surface of the driving rotor engages with its counterpart of the driven rotor as the driving rotors and the driven rotors approach to be in contact with each other when the driving member receives the driving force from the driven member. At least one of the two engagement portions is formed in a projecting shape.

2. Description of Background Art

A dog clutch that is disposed between two gears opposite each other and being a part of a constant mesh gear transmission, is known, for example, in Japanese Patent Laid-open Publication No. 2001-74061.

The torque operating on the first engagement face is engaged to transmit power from a driving rotor to a driven rotor with the driving member being in an accelerated state. When the torque becomes larger than the torque operating on the second engagement face, the driving force is caused to be applied from the driven rotors to the driving rotors with the driving member being in a decelerated state. Further, it is necessary that the engagement portions are formed to be stronger in its outer part along the radial direction of the driving rotors and driven rotors. In the dog clutch disclosed in the above-described Japanese Patent Laid-open Publication No. 2001-74061, the first and the second engagement faces of the engagement portions are formed in such a manner that each of the inward extension lines is formed to pass through a position representing the rotational axis on a projection drawing to a plane perpendicular to the rotational axis. In addition, the width along the circumferential direction of each of the engagement portions becomes larger in its outer part along the radial direction. As a result, though the engagement portions satisfies the requirement in strength, each of the engagement portions does not have a shape reflecting the difference between the torque operating on the engagement portions at the time of acceleration and the torque at the time of deceleration.

SUMMARY AND OBJECTS OF THE INVENTION

The present invention has been made in view of the forgoing. Accordingly, an object of an embodiment of the present invention is to provide a dog clutch that, reflecting the change in torque being operated, which is brought about by the change in direction of the power transmission, can make engagement portions well-balanced in terms of the strength without increasing its weight.

To attain the above-described object, according to an object of the present invention a dog clutch is provided wherein the clutch includes a driving rotor connected to a driving member and a driven rotor connected to a driven member that are coaxially arranged to be capable of approaching to be in contact with and moving away from each other, the two rotors being opposite each other. In addition, on each of a surface of the driving rotor and a surface of the driven rotor, the two surfaces being opposite each other, an engagement portion having a first engagement face and a second engagement face is provided. The first engagement face of an engagement portion engages with its counterpart as the driving rotor and the driven rotor approach to contact with each other when a driving force of the driving member is generated. The second engagement face of an engagement portion engages with its counterpart as the driving rotor and the driven rotor approach to be in contact with each other when the driving member receives the driving force from the driven member. Furthermore, at least one of the two engagement portions is formed in a projecting shape. In the dog clutch described above, a projection is drawing to a plane perpendicular to the rotational axis of the driving rotor and the driven rotor with the inward extension line of the first engagement face passing though a position offset from the position representing the rotational axis and the inward extension line of the second engagement face passing through the position representing the rotational axis. The engagement portion is formed in a substantially trapezoidal shape with the width along the circumferential direction on the radial outward side being larger than the width along the circumferential direction on the radial inward side.

In addition, an embodiment of the present invention provides a second engagement face that is formed along a plane passing through the rotational axis. The first engagement face is formed, being inclined in a manner that the width along the circumferential direction of the projecting one of the two engagement portions is larger in a part closer to the head end in the projecting direction.

Furthermore, an embodiment of the present invention provides projecting engagement portions formed as projecting in even-numbered positions spaced apart at regular intervals in the circumferential direction of at least one of the driving rotor and the driven rotor.

It is to be noted that each of a first-speed driven gear 32, a second-speed driven gear 34, a third-speed driving gear 35, a third-speed driven gear 36, a fourth-speed driving gear 37, and a fourth-speed driven gear 38 of the example corresponds to the driving rotor of the present invention. A fifth-speed driving gear 39, a fifth-speed driven gear 40, a sixth-speed driving gear 41, a sixth-speed driven gear 42, a first/fourth-speed switching shifter 45 and a second/third-speed switching sifter 46 of the example corresponds to the driven rotor of the present invention.

According to an embodiment of the present invention, each of the first engagement faces, engaging with each other when power is transmitted from the driving rotor to the driven rotor, is formed to have the inward extension line pass through a position offset from the position representing the rotational axis. As a result, the contact area of the first engagement face can be made larger than the contact area of the second engagement face. The inward extension line of the second engagement face is formed to pass through the position representing the rotational axis, and engages with its counterpart when power is transmitted from the driven rotor to the driving rotor. As a result, a balance of the strength is obtained, which reflects the different torque operating on the engagement faces, the torque changing as the power transmission direction is changed. In addition, each of the engagement portions is formed in a substantially trapezoidal shape with the width along the circumferential direction on the radial outward side being larger than the width along the circumferential direction on the radial inward side. As a result, the strength of the engagement portions is secured while avoiding an increase in the weight.

In addition, according to an embodiment of the present invention, the contact area of the first engagement face is larger than that of the second engagement face so that the first engagement faces can engage with each other securely responding to the large torque operating when the power is transmitted from the driving rotor to the driven rotor. Further, since the second engagement faces are formed along the plane passing through the rotational axis, there is no need of a mechanical process, or the like. As a result, the cost can be reduced and the engagement portion can be formed in an optimum shape reflecting the characteristics needed at the time of power transmission.

Further, according to an embodiment of the present invention, the projecting engagement portions are arranged in even-numbered positions spaced apart at regular intervals in the circumferential direction. As a result, the driving force at the time of engagement can be well-balanced. In addition, the extension line of the first engagement face does not pass through the position representing the rotational axis. As a result, when the first engagement face, which is provided, as being inclined, in the projecting engagement portion, is formed by machining, the jig can pass through the engagement portion so as not to pass through the opposite projecting engagement portion. In addition, the machining process can be easily carried out without a complicated process such as a NC process. This leads to higher productivity and a reduced processing cost.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only, and thus are not limitative of the present invention, and wherein.

DETAILED DESCRIPTION OF THE PREFERRED EMBODIMENTS

Embodiments of the present invention will be described based on an example of the present invention shown in the accompanying drawings.

Figure 1:
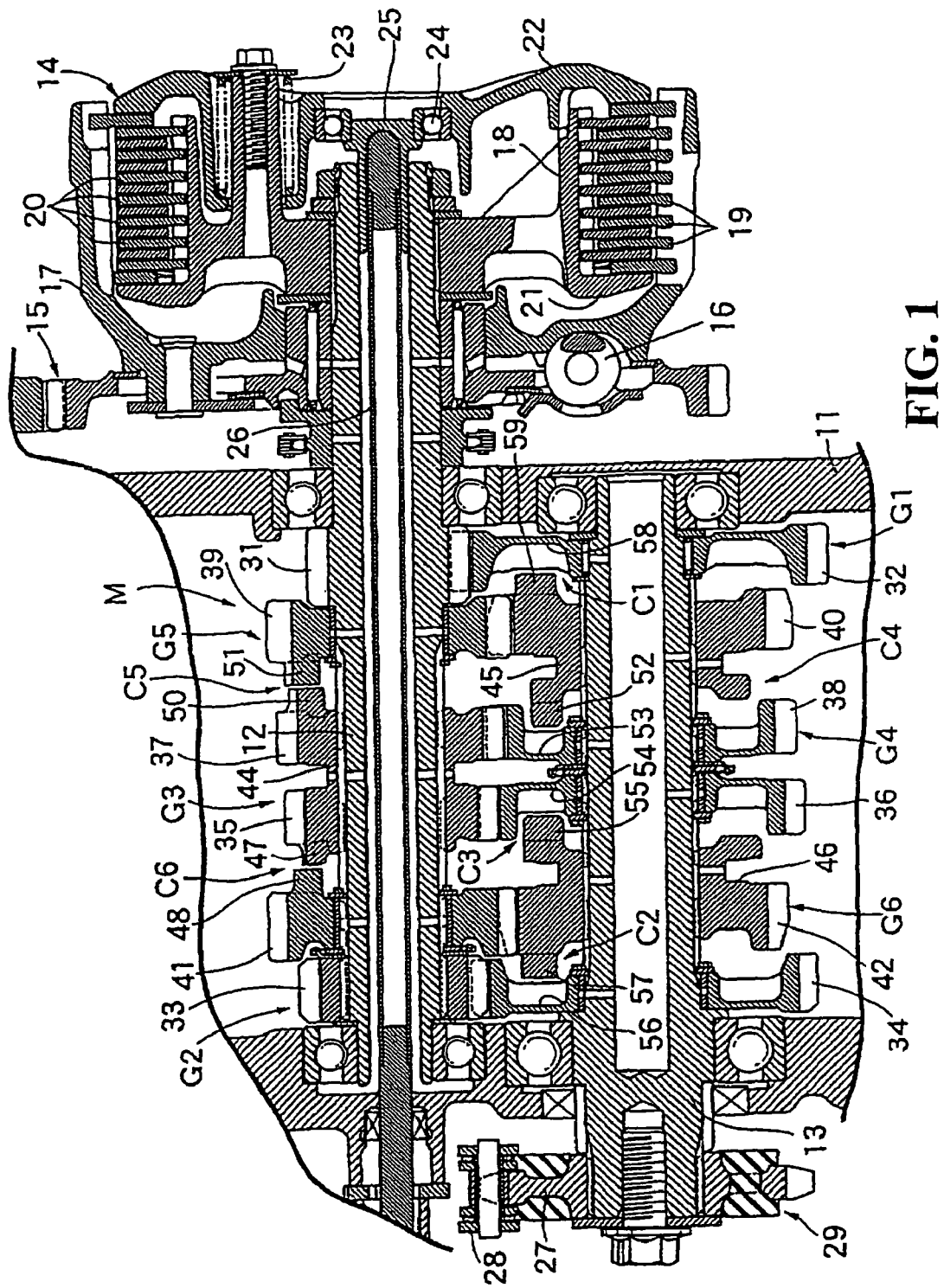
FIG. 1 is a vertical sectional view of a constant mesh gear transmission M.

FIGS. 1 to 5 show an example of the present invention. As illustrated in FIG. 1, a constant mesh gear transmission M is used, for example, in an automatic two-wheeled vehicle. The transmission M includes a main shaft 12 and a counter shaft 13, which have axes paralleled with each other and are rotatably supported by a crank case 11. The transmission M also includes gear trains which are provided between the main shaft 12 and the counter shaft 13, and which include a plural transmission of levels, for example six levels. That is, the transmission M in this case has the first to the sixth-speed gear trains: G1, G2, G3, G4, G5, and G6. These gear trains can be established selectively.

An end portion of the main shaft 12 is equipped with a start clutch 14 for switching connection and disconnection between the main shaft 12 and the crankshaft (not shown) of the engine which is the power source. The start clutch 14 is provided with a clutch outer 17 in which power is transmitted from the crankshaft through a primary speed-reduction device 15 and a torque damper 16, and a clutch inner 18 arranged in a center portion of the clutch outer 17 and coupled to, but not rotatably in relation to, the main shaft 12. The start clutch 14 is also provided with a plurality of driving friction plates 19, which are splined to the inner circumferential wall of the clutch outer 17, slidably in an axial direction. A plurality of driven friction plates 20 are alternately stacked with these driving friction plates 19 and are splined to the outer circumference of the clutch inner 18, slidably in an axial direction. The start clutch 14 is also provided with a pressure receiving plate 21 integrally formed at the inner end of the clutch inner 18 to receive the innermost driving friction plate 19. A pressure applying plate 22 is slidably attached to the outer end of the clutch inner 18 and is capable of pressing the outermost driving friction plate 19. A clutch spring 23 biases the pressure applying plate 22 toward the pressure receiving plate 21.

Thus, when the driving friction plates 19 and the driven friction plates 20 are held between the pressure applying plate 22 and the pressure receiving plate 21 with the energizing force of the clutch spring 23, the start clutch 14 is engaged. As a result, the clutch outer 17 and the clutch inner 18 are connected by friction with each other.

In addition, in the center portion of the clutch inner 18, a release member 25 is arranged, with a release bearing 24 being put between the release member 25 and the pressure applying plate 22. A push rod 26, is movable in an axial direction and is inserted into the main shaft 12 and is connected to this release member 25. By operating a clutch lever, which is not shown, the push rod 26 is pushed, and the pressure applying plate 22 is caused to be retrieved against the spring force of the clutch spring 23. Thus, the driving friction plates 19 and the driven friction plates 20 are released. Thus, the clutch outer 17 and the clutch inner 18 are disconnected, and the start clutch 14 is disengaged.

One portion of the counter shaft 13 projects from the crank case 11 at the side opposite to the start clutch 14, and a driving sprocket 27 is fixed to the end portion of the counter shaft 13, the end portion projecting from the crank case 11. The driving sprocket 27 configures a part of transmission means 29 together with an endless chain 28, which wraps around the driving sprocket 27. The power outputted from the counter shaft 13 is transmitted through the transmission means 29 to a rear wheel, which is not shown.

A first-speed gear train G1 includes a first-speed driving gear 31, which is integrally formed in the main shaft 12, and a first-speed driven gear 32, which is mounted on and is capable of relatively rotating about the counter shaft 13, to mesh with the first-speed driving gear 31. A second-speed gear train G2 includes a second-speed driving gear 33, which is mounted on and which is incapable of relatively rotating about the main shaft 12, and a second-speed driven gear 34, which is capable of relatively rotating about the counter shaft 13, and which is meshed with the second-speed driving gear 33. A third-speed gear train G3 includes a third-speed driving gear 35, which is incapable of relatively rotating about the main shaft 12, and a third-speed driven gear 36, which is mounted on and capable of relatively rotating about the counter shaft 13 and is geared with the third speed driving gear 35. A fourth-speed gear train G4 includes a fourth-speed driving gear 37, which is incapable of relatively rotating about the main shaft 12, and a fourth-speed driven gear 38, which is mounted on and capable of relatively rotating about the counter shaft 13 and is meshed with the fourth-speed driving gear 37. A fifth-speed gear train G5 includes a fifth-speed driving gear 39, which is mounted on and capable of relatively rotating about the main shaft 12, and a fifth-speed driven gear 40, which is incapable of relatively rotating about the counter shaft 13 and is meshed with the fifth-speed driving gear 39. A sixth-speed gear train G6 includes a sixth-speed driving gear 41, which is mounted on and capable of relatively rotating about the main shaft 12, and a sixth-speed driven gear 42, which is incapable of relatively rotating about the counter shaft 13 and is meshed with the sixth-speed driving gear 41.

Between the fifth-speed driving gear 39 and the sixth-speed driving gear 41, a fifth/sixth-speed switching shifter 44 is splined to fit the main shaft 12, slidably in an axial direction. The third-speed driving gear 35 is integrally formed on the fifth/sixth-speed switching shifter 44, the gear 35 being opposite the sixth-speed driving gear 41. The fourth-speed driving gear 37 is integrally formed on the fifth/sixth-speed switching shifter 44, the gear 37 being opposite the fifth-speed driving gear 39. In addition, between the first-speed driven gear 32 and the fourth-speed driven gear 38, a first/fourth-switching shifter 45 in which the fifth-speed driven gear 40 is integrally formed is splined to fit the counter shaft 13, the shifter 45 being slidable in an axial direction. Between the second-speed driven gear 34 and the third-speed driven gear 36, a second/third-speed switching shifter 46 in which the sixth-speed driven gear 42 is integrally formed is splined to fit the counter shaft 13, with the shifter 46 being capable of sliding in an axial direction.

The constant mesh gear transmission M is provided with a first- to a sixth-speed dog clutches C1 to C6 for selectively establishing the first- to the sixth-speed gear trains G1 to G6. The sixth-speed dog clutch C6 is provided between the third-speed driving gear 35 as a driving rotor connected to the main shaft 12 as a driving member and the sixth-speed driving gear 41, opposite the third-speed driving gear 35, as a driven rotor connected to the counter shaft 13, which is the driven member. The fifth-speed dog clutch C5 is provided between the fourth-speed driving gear 37 as a diving rotor and the fifth-speed driving gear 39 as a driven rotor, opposite the fourth-speed driving gear 37. In addition, the fourth-speed dog clutch C4 is provided between the fourth-speed driven gear 38 as a driving rotor and the first/fourth-speed switching shifter 45 as a driven rotor, opposite the fourth-speed driven gear 38. The first-speed dog clutch C1 is provided between the first-speed driven gear 32 as a driving rotor and the fifth-speed driven gear 40 as a driven rotor, opposite the first-speed driven gear 32. Further, the second-speed dog clutch C2 is provided between the second-speed driven gear 34 as a driving rotor and the sixth-speed driven gear 42 as a driven rotor, opposite the second-speed driven gear 34. The third-speed dog clutch C3 is provided between the third-speed driven gear 36 as a driving rotor and the second/third-speed switching shifter 46 as a driven rotor, opposite to the third-speed driven gear 36.

The sixth-speed dog clutch C6 is provided with engagement portions 47 provided in even-numbered positions, for example six positions, spaced apart at regular intervals in the circumferential direction on a surface of the third-speed driving gear 35, the surface being opposite the sixth-speed driving gear 41. The sixth-speed dog clutch C6 is also provided with engagement portions 48 provided in even-numbered positions, for example six positions, spaced apart at regular intervals in the circumferential direction on a surface of the sixth-speed driving gear 41 the surface being opposite the third-speed driving gear 35. The engagement portions 47 and 48 engage with each other when the fifth/sixth-speed switching shifter 44 slides in an axial direction to make the third-speed driving gear 35 approach to be in contact with to the sixth speed driving gear 41. In addition, the sixth-speed driving gear 41 is connected to the main shaft 12 with the third-speed driving gear 35, the gear 41 being incapable of relatively rotating about the main shaft 12. In this state, the sixth-speed driving gear 41 rotates along with the main shaft 12, and thus, the sixth-speed gear train G6 is established.

Figure 2:
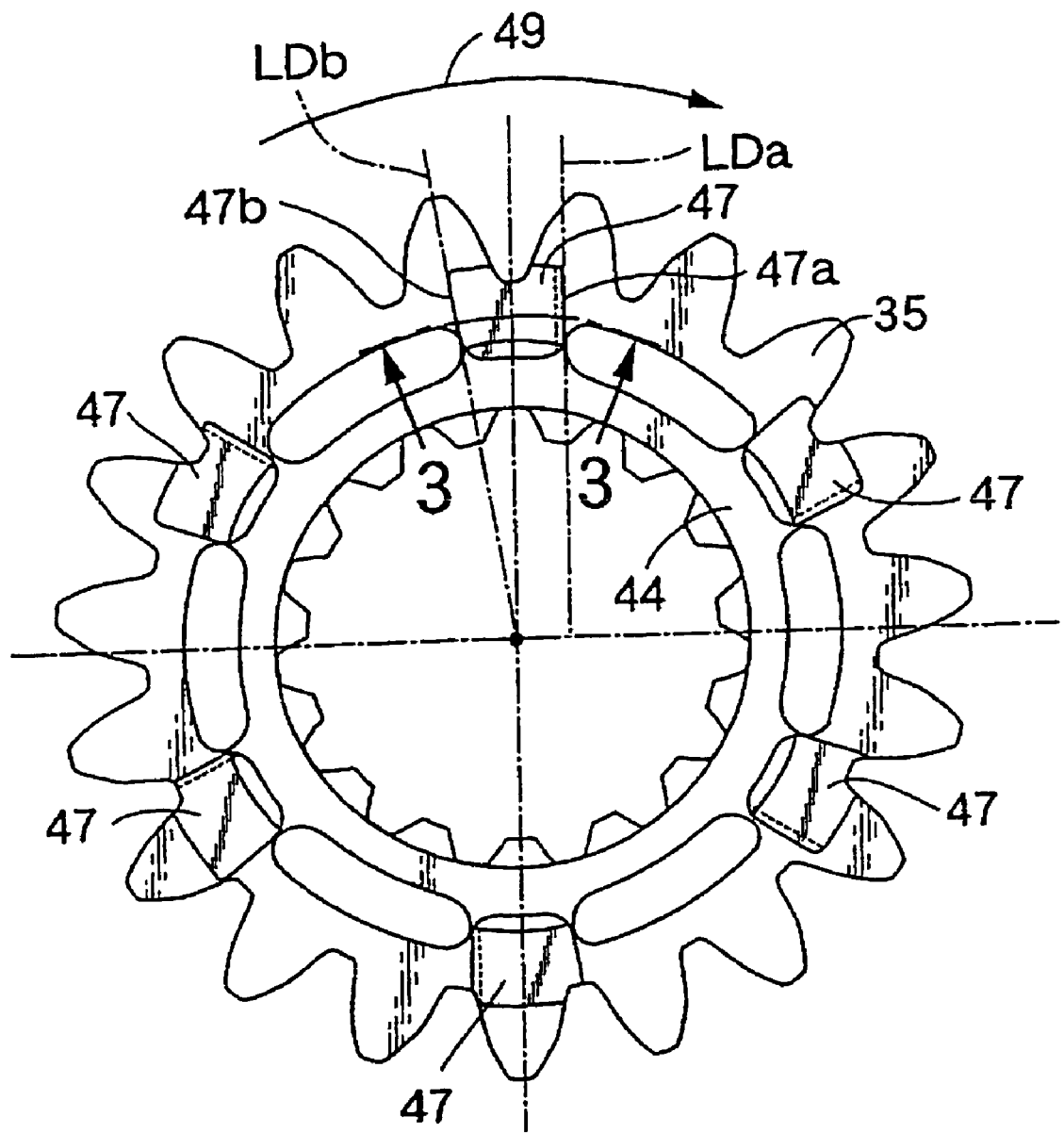
FIG. 2 is a front view showing a surface of the third-speed driving gear, the surface being opposite to the sixth-speed driving gear.

In FIG. 2, the engagement portion 47 is provided on a surface of the third-speed driving gear 35 with the surface being opposite to the sixth-speed driving gear 41 and is formed in a projecting shape projecting towards the sixth-speed driving gear 41. The engagement portion 47 has, on each of the two sides of the circumferential direction, a first engagement face 47a and a second engagement face 47b. The first engagement face 47a directs in a rotational direction shown by an arrow 49. The rotational direction 49 is the direction in which the third-speed driving gear 35 rotates together with the main shaft 12 to which the rotational power of the engine is transmitted from the crankshaft when the start clutch 14 is engaged. The second engagement face 47b faces the opposite direction of the rotational direction 49.

On the projection drawing to the plane perpendicular to the rotational axis of the third-speed driving gear 35 and the sixth-speed driving gear 41, that is, the axis of the main shaft 12, the engagement portion 47 is formed in a trapezoidal shape in the following manner. The width along the circumferential direction on the radial outward side is larger than the width along the circumferential direction on the radial inward side by making the first engagement face 47a have the inward extension line LDa passing through a position offset from the position representing the rotational axis and by making the second engagement face 47b have the inward extension line LDb passing through the position representing the rotational axis.

Figure 3:
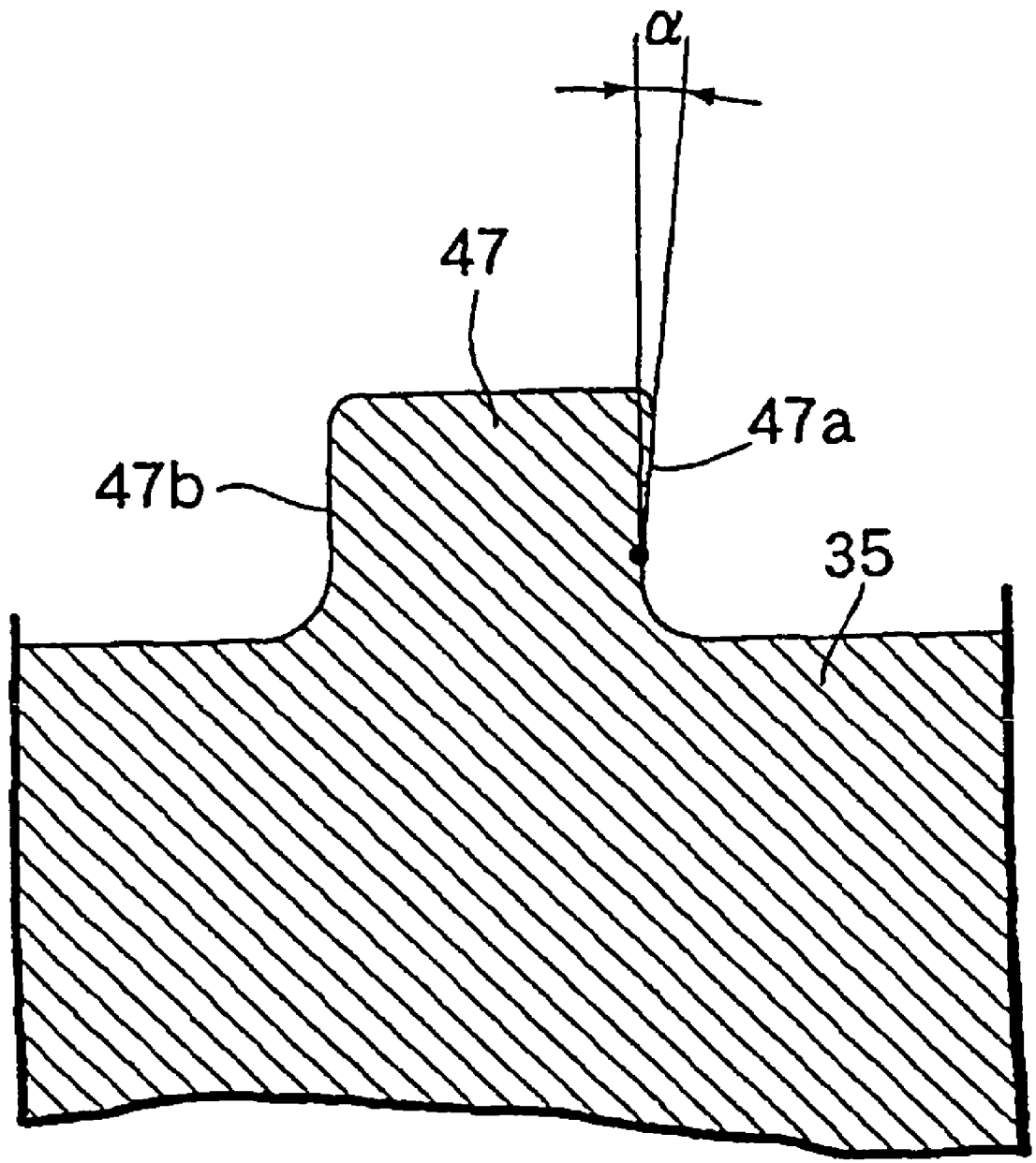
FIG. 3 is an enlarged sectional view taken along the 3-3 line in FIG. 2.

Moreover, in contrast to the second engagement face 47b formed along the plane passing through the rotational axis, the first engagement face 47a is, as specified in FIG. 3, formed as being inclined by an angle α. As a result, the width along the circumferential direction of the engagement portion 47 becomes larger in a position closer to the head end in the projecting direction.

Figure 4:
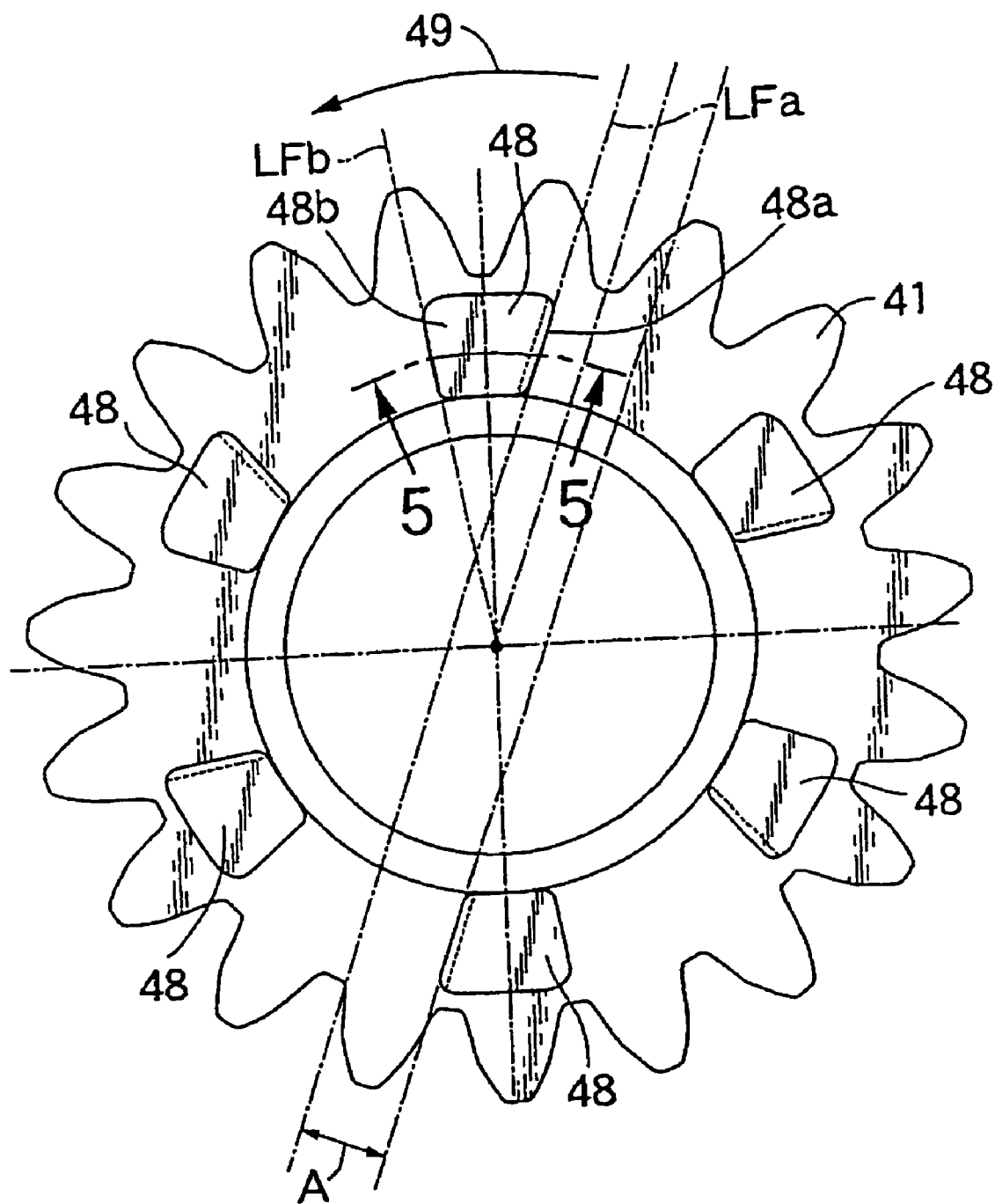
FIG. 4 is a front view showing a surface of the sixth-speed driving gear, the surface being opposite the third-speed driving gear.

In FIG. 4, the engagement portion 48 provided on a surface of the sixth-speed driving gear 41, the surface being opposite the third speed driving gear 35, is formed in a projecting shape projecting towards the third-speed driving gear 35. The engagement portion 48 has, on each of the two sides of the circumferential direction, the first engagement face 48a and the second engagement face 48b. The first engagement face 48a faces the opposite side of the rotational direction 49 of the third-speed driving gear 35, and the second engagement face 48b directs to the rotational direction 49.

On the projection drawing to the plane perpendicular to the rotational axis of the third-speed driving gear 35 and the sixth-speed driving gear 41, that is, the axis of the main shaft 12, the engagement portion 48 is formed in a trapezoidal shape in the following manner. The width along the circumferential direction on the radial outward side is larger than the width along the circumferential direction on the radial inward side by making the first engagement face 48a have the inward extension line LFa passing through a position offset from the position representing the rotational axis, and by making the second engagement portions 48b have the inward extension line LFb passing through the position representing the rotational axis.

Figure 5:
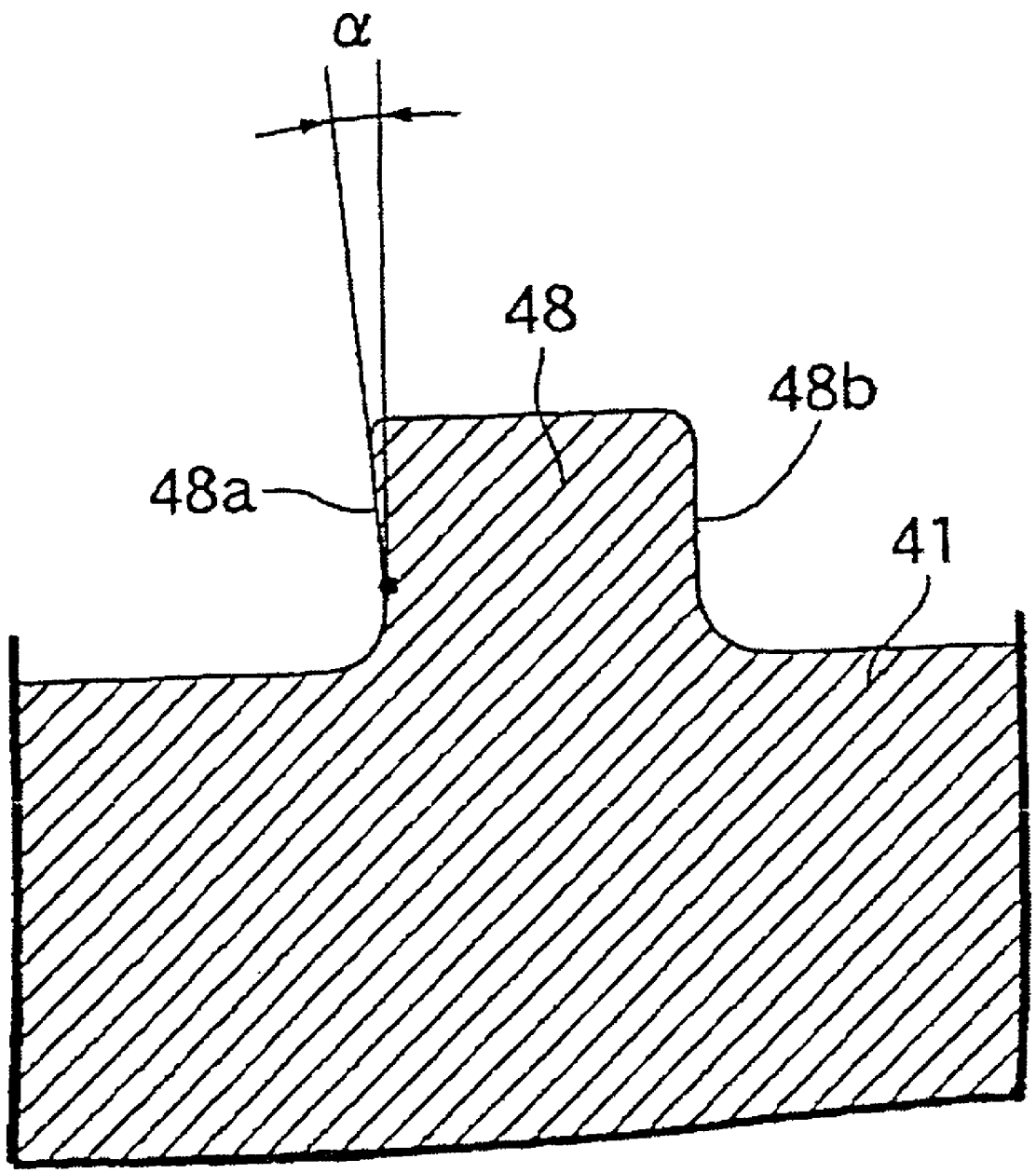
FIG. 5 is an enlarged sectional view taken along the 5-5 line in FIG. 4.

Moreover, in contrast to the second engagement face 48b, which is formed along the plane passing through the rotational axis, the first engagement face 48a is, as specified in FIG. 5, formed as being inclined by an angle α. As a result, the width along the circumferential direction of the engagement portion 48 becomes larger in a position closer to the head end in the projecting direction.

When the engine is accelerated with the brake not being put on the rear wheel, the first engagement face 47a of the engagement portions 47 provided in the third-speed driving gear 35 engages with the first engagement face 48a of the engagement portion 48 provided in the sixth-speed driving gear 41, in response to the third-speed driving gear 35 approaching to be in contact with the sixth-speed driving gear 41. As a result, the sixth-speed dog clutch C6 is engaged, and power is transmitted from the third-speed driving gear 35 to the sixth-speed driving gear 41. However, under the condition that the sixth-speed dog clutch C6 is engaged, and that the brake is put on the rear wheel, or the engine is decelerated, the second engagement face 47b of the engagement portions 47 provided in the third-speed driving wheel 35 is engaged with the second engagement face 48b of the engagement portion 48 provided in the sixth-speed driving gear 41. As a result, the third-speed driving gear 35 receives the driving force from the sixth-speed driving gear 41.

The fifth-speed dog clutch C5 has the engagement portion 50 formed as projecting on a surface of the fourth-speed driving gear 37, the surface being opposite the fifth-speed driving gear 39, and the engagement portion 51 formed as projecting on a surface of the fifth-speed driving gear 39, the surface being opposite the fourth-speed driving gear 37. The configuration of the fifth-speed dog clutch C5 is basically the same as that of the sixth-speed dog clutch C6. When the fifth-speed dog clutch C5 is engaged, the fifth-speed driving gear 39 rotates along with the main shaft 12. Thus, the fifth-speed gear train G5 is established.

The fourth-speed dog clutch C4 has the engagement portion 52 formed as projecting on a surface of the fourth-speed driven gear 38, the surface being opposite to the first/fourth-speed switching shifter 45, and the engagement portion 53 formed as being depressed in a surface of the first/fourth-speed switching shifter 45, the surface being opposite the fourth-speed driven gear 38. The engagement portion 52 is configured to be similar to the engagement portion 50 of the sixth-speed dog clutch C6. The engagement portion 53 has a shape capable of engaging the engagement portion 52, and is formed as being depressed in the first/fourth-speed switching shifter 45. With this configuration, when the fourth-speed dog clutch C4 is engaged, the fourth-speed driven gear 38 rotates along with the counter shaft 13, and the fourth-speed gear train G4 is established.

The third-speed dog clutch C3 has the engagement portion 54 formed as being depressed in a surface of the third-speed driven gear 36, the surface being opposite the second/third-speed switching shifter 46, and the engagement portion 55 formed as projecting on a surface of the second/third-speed switching shifter 46, the surface being opposite the third-speed driven gear 36. The engagement portion 55 is configured to be similar to the engagement portion 51 of the sixth-speed dog clutch C6. The engagement portion 54 has a shape capable of engaging the engagement portion 55, and is formed as being depressed in the second/third-speed switching shifter 46. With this configuration, when the third-speed dog clutch C3 is engaged, the third-speed driven gear 36 rotates along with the counter shaft 13, and the third-speed gear train G3 is established.

The second-speed dog clutch C2 has the engagement portion 56 formed as projecting on a surface of the second-speed driven gear 34, the surface being opposite the sixth-speed driven gear 42, and the engagement portion 57 formed as being depressed in a surface of the sixth-speed driven gear 42, the surface being opposite the second-speed driven gear 34. The engagement portion 56 is configured to be similar to the engagement portion 50 of the sixth-speed dog clutch C6. The engagement portion 57 has a shape capable of engaging the engagement portion 56, and is formed as being depressed in the second-speed driven gear 34. With this configuration, when the second-speed dog clutch C2 is engaged, the second-speed driven gear 34 rotates along with the counter shaft 13, and the second-speed gear train G2 is established.

Further, the first-speed dog clutch C1 has the engagement portion 58 formed as being depressed in a surface of the first-speed driven gear 32, the surface being opposite the fifth-speed driven gear 40, and the engagement portion 59 formed as projecting on a surface of the fifth-speed driven gear 40, with the surface being opposite the first-speed driven gear 32. The engagement portion 59 is configured to be similar to the engagement portion 51 of the sixth-speed dog clutch C6. The engagement portion 58 has a shape capable of engaging the engagement portion 59, and is formed as being depressed in the first-speed driven gear 32. With this configuration, when the first-speed dog clutch C1 is engaged, the first-speed driven gear 32 rotates along with the counter shaft 13, and the first-speed gear train G1 is established.

Next, operations of this example will be described. In the sixth-speed dog clutch C6, on a surface of the third-speed driving gear 35, which is a driving rotor, and on a surface of the second-speed driving gear 41, which is a driven rotor, the engagement portions 47 and 48 are respectively provided. The engagement portions 47 and 48 have, respectively, the first engagement faces 47a and 48a, engaging with each other as the third-speed driving gear 35 and the sixth-speed driving gear 41 approach to be in contact with each other when driving force of the main shaft 12 is generated. The engagement portions 47 and 48 also have, respectively, the second engagement faces 47b and 48b, engaging with each other when the main shaft 12 receives the driving force from the counter shaft 13 when the third-speed driving gear 35 and the sixth-speed driving gear 41 approach to be in contact with each other. On the projection drawing to the plane perpendicular to the rotational axis of the main shaft 12, the inward extension lines LDa and LFa, respectively, of the first engagement faces 47a and 48a, pass through the position offset from the position representing the rotational axis. The inward extension lines LDb and LFb, respectively, of the second engagement faces 47b and 48b, pass through the position representing the rotational axis. With this configuration, each of the engagement portions 47 and 48 is formed in a trapezoidal shape with the width along the circumferential direction on the radial outward side being larger than the width along the circumferential direction on the radial inward side.

According to the configuration of such a sixth-speed dog clutch C6, the contact areas of the first engagement faces 47a and 48a can be larger than those of the second engagement faces 47b and 48b. As a result, a balance of the strength is obtained, which reflects the different torque operating on the engagement faces, the torque changing as the power transmission direction is changed. In addition, each of the engagement portions 47 and 48 is formed in a substantially trapezoidal shape that the width along the circumferential direction on the radial outward side being larger than the width along the circumferential direction on the radial inward side. As a result, the strength of the engagement portions 47 and 48 are secured while an increase in the weight can be avoided.

In addition, in contrast to the second engagement faces 47b and 48b, which are formed along the plane passing through the rotational axis of the main shaft 12, each of the first engagement faces 47a and 48a is formed as being inclined in such a manner that the width along the circumferential direction of each of the engagement portions 47 and 48 is larger in a part closer to the head end in the projecting direction. As a result, the contact areas of the first engagement faces 47a and 48a can be larger and the first engagement faces 47a and 48a can more surely be engaged with each other in response to the large torque operating when the power is transmitted from the third-speed driving gear 35 to the sixth-speed driving gear 41. Moreover, since each of the second engagement faces 47b and 48b is formed along the plane passing through the rotational axis of the main shaft 12, there is no need of a machining process or the like. As a result, the cost can be reduced and the engagement portions 47 and 48 can be formed in an optimum shape reflecting the characteristics needed at the time of power transmission.

The engagement portions 47 and 48 are formed as projecting in even-numbered positions, for example six positions, spaced apart at regular intervals in the circumferential direction of the third-speed driving gear 35 and of the sixth-speed driving gear 41, respectively. As a result, the driving force at the time of engagement can be well-balanced. In addition, each of the extension lines of the first engagement faces 47a and 48a does not pass through the position representing the rotational axis. As a result, when the first engagement portions 47a and 48a, which are provided, as being inclined, on the projecting engagement portions 47 and 48, respectively, are formed by a machining process, a jig can pass through the engagement portions 47 and 48, without passing through the projecting engagement portions 47 and 48 on the opposite surface. In addition, the machining process can be easily carried out without carrying out a complicated process such as NC process. This leads to higher productivity and a reduced cost of processing.

In particular, in a case of the sixth-speed driving gear 41, the processing can be performed by causing a cutting tool to pass through within a region of a width A as shown in FIG. 4. In addition, in a case where a double-edged cutting tool is used, only with a single passing of the cutting tool, both of the inclined first engagement faces 48a of the two projecting engagement portions 48, which are arranged opposite each other, can be processed.

These operations and effects obtained in the case of the sixth-speed dog clutch C6 can be also obtained in the cases of the first- to fifth-speed dog clutches C1 to C5.

An example of the present invention has been described above, but the present invention is not limited to the above-described example and various changes in design can be made without departing from the present invention described in the scope of claims.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A dog clutch comprising:
   a driving rotor connected to a driving member and a driven rotor connected to a driven member are coaxially arranged as being opposite each other, and being capable of approaching to be in contact with and moving away from each other;
   a first engagement portion is provided on a surface of the first driving rotor and a second engagement portion is provided on a surface of the driven rotor, the two surfaces being opposite each other;
   each of the first and second engagement portions includes a first engagement face and a second engagement face, the first engagement face of the first engagement portion engaging with the first engagement face of the second engagement portion, as the driving rotor and the driven rotor approach to be in contact with each other when driving force of the driving member is generated, and the second engagement face of the first engagement portion engaging with the second engagement face of the second engagement portion, as the driving rotor and the driven rotor approach to contact with each other when the driving member receives driving force from the driven member; and
   at least one of the first and second engagement portions is formed of at least one projection drawn to a plane perpendicular to a rotational axis of the driving rotor and the driven rotor,
   an inward extension line of the first engagement face of each of the first and second engagement portions passes through a position offset from the position representing the rotational axis and an inward extension line of the second engagement face of each of the first and second engagement portions passes through the position representing the rotational axis; and
   each of the first and second engagement portions is formed in a substantially trapezoidal shape with the width along the circumferential direction on the radially outward side being larger than the width along the circumferential direction on the radially inward side.

2. The dog clutch according to claim 1, wherein
   the second engagement face of each of the first and second engagement portions is formed along a plane passing through the rotational axis, and
   the first engagement face of each of the first and second engagement portions is formed, being inclined in a manner that the width along the circumferential direction of the at least one of the first and second engagement portions formed of the at least one projection is larger in a part closer to a head end in a projecting direction of the at least one projection.

3. The dog clutch according to claim 2, wherein the at least one projection includes an even-number of projections spaced apart at regular intervals in the circumferential direction of the rotor.

4. The dog clutch according to claim 1, wherein the first engagement face of each of the first and second engagement portions is inclined at an angle wherein a width along the circumferential direction of a corresponding one of the first and second engagement portions becomes larger in a position closer to a head end in a projecting direction of the at least one projection.

5. The dog clutch according to claim 1, wherein the inward extension line of the first engagement face of each of the first and second engagement portions is offset a predetermined distance from the rotational axis in a direction of rotation.

6. The dog clutch according to claim 5, wherein the inward extension line of the first engagement face of each of the first and second engagement portions intersects the inward extension line of the second engagement face of a corresponding one of the first and second engagement portions.

7. A dog clutch comprising:
a driving rotor operatively connected to a driving member;
a driven rotor operatively connected to a driven member, said driving rotor and driven rotor being coaxially arranged opposite each other, and being capable of approaching to be in contact with and moving away from each other;
a first engagement portion formed on a surface of the driving rotor and a second engagement portion formed on a surface of the driven rotor, the two surfaces being opposite each other;
each of the first and second engagement portions includes a first engagement face and a second engagement face, the first engagement face of the first engagement portion engaging with the first engagement face of the second engagement portion, as the driving rotor and the driven rotor approach to be in contact with each other when driving force of the driving member is generated, and the second engagement face of the first engagement portion engaging with the second engagement face of the second engagement portion, as the driving rotor and the driven rotor approach to contact with each other when the driving member receives driving force from the driven member;
an inward extension line of the first engagement face of each of the first and second engagement portions passes through a position offset from the position representing a rotational axis and an inward extension line of the second engagement face of each of the first and second engagement portions passes through the position representing the rotational axis; and
each of the first and second engagement portions is formed in a substantially trapezoidal shape with the width along the circumferential direction on the radially outward side being larger than the width along the circumferential direction on the radially inward side.

8. The dog clutch according to claim 7, wherein
the second engagement face of each of the first and second engagement portions is formed along a plane passing through the rotational axis, and
the first engagement face of each of the first and second engagement portions is formed, being inclined in a manner that the width along the circumferential direction of a projecting one of the first and second engagement portions is larger in a part closer to a head end in a projecting direction.

9. The dog clutch according to claim 8, wherein at least one of the driving rotor and the driven rotor is provided with the projecting one of the first and second engagement portions formed of an even-number of projections spaced apart at regular intervals in the circumferential direction of the rotor.

10. The dog clutch according to claim 7, wherein the first engagement face of each of the first and second engagement portions is inclined at an angle wherein a width along the circumferential direction of a corresponding one of the first and second engagement portions becomes larger in a position closer to a head end in a projecting direction.

11. The dog clutch according to claim 7, wherein the inward extension line of the first engagement face of each of the first and second engagement portions is offset a predetermined distance from the rotational axis in a direction of rotation.

12. The dog clutch according to claim 11, wherein the inward extension line of the first engagement face of each of the first and second engagement portions intersects the inward extension line of the second engagement face of a corresponding one of the first and second engagement portions.

13. A dog clutch comprising:
a driving rotor connected to a driving member;
a driven rotor connected to a driven member with the driving rotor and the driven rotor being coaxially arranged opposite each other, and being movable into contact with and movable away from contact with each other;
a first engagement portion provided on a surface of the driving rotor;
a second engagement portion provided on a surface of the driven rotor, the surfaces of the driving rotor and the driven rotor being opposite each other;
each of the first and second engagement portions includes a first engagement face and a second engagement face, the first engagement face of the first engagement portion engaging with the first engagement face of the second engagement portion, as the driving rotor and the driven rotor approach to be in contact with each other when a driving force of the driving member is generated, and the second engagement face of the first engagement portion engaging with the second engagement face of the second engagement portion, as the driving rotor and the driven rotor approach to contact with each other when the driving member receives a driving force from the driven member; and
at least one of the first and second engagement portions is formed of at least one projection drawn to a plane perpendicular to a rotational axis of the driving rotor and the driven rotor,
an inward extension line of the first engagement face of each of the first and second engagement portions passes through a position offset from a position representing the rotational axis and an inward extension line of the second engagement face of each of the first and second engagement portions passes through a position representing the rotational axis; and
each of the first and second engagement portions is formed in a shape with the width along the circumferential direction on a radially outward side being larger than the width along the circumferential direction on a radially inward side.

14. The dog clutch according to claim 13, wherein
the second engagement face of each of the first and second engagement portions is formed along a plane passing through the rotational axis, and the first engagement face of each of the first and second engagement portions is formed, being inclined in a manner that the width along the circumferential direction of the at least one of the first and second engagement portions formed of the at least one projection is larger in a part closer to a head end in a projecting direction of the at least one projection.

15. The dog clutch according to claim 14, wherein the at least one projection includes an even-number of projections spaced apart at regular intervals in the circumferential direction of the rotor.

16. The dog clutch according to claim 13, wherein the first engagement face of each of the first and second engagement portions is inclined at an angle wherein a width along the circumferential direction of a corresponding one of the first and second engagement portions becomes larger in a position closer to a head end in a projecting direction of the at least one projection.

* * * * *